United States Patent [19]

Udyma et al.

[11] 4,409,908

[45] Oct. 18, 1983

[54] METHOD FOR THERMAL DECONTAMINATION OF WASTE WATERS

[76] Inventors: Petr G. Udyma, ulitsa Bolshaya Cherkizovskaya, 1, korpus 1, kv. 25, Moscow; Ionas A. Gilis, ulitsa Grinchiunio, 7, kv. 425, Kaunas; Sergei V. Zhubrin, ulitsa Dovzhenko, 6, kv. 58; Alexandr V. Sakharnov, Vinnitskaya ulitsa, 3, kv. 94, both of Moscow; Boris A. Rodioov, Khlebozavodskoi tupik, 7, kv. 1, Ljubertsy; Moskovskoi oblasti; Vladimir V. Skornyakov, ulitsa Chaikovskogo, 1/2, kv. 28, Moscow, all of U.S.S.R.

[21] Appl. No.: 75,246

[22] Filed: Sep. 13, 1979

Related U.S. Application Data

[63] Continuation of Ser. No. 901,305, May 1, 1978, abandoned.

[51] Int. Cl.³ ............................. F23G 7/04; C02F 1/72
[52] U.S. Cl. .................................... 110/346; 110/238; 210/703; 210/706; 210/758; 210/774; 261/122; 261/DIG. 26
[58] Field of Search .................... 210/44, 50, 56, 63 R, 210/71, 221 P, 703–707, 721, 722, 737, 758, 774; 261/122, DIG. 26; 110/238, 346

[56] References Cited

U.S. PATENT DOCUMENTS

| Re. 26,449 | 6/1968 | Bradt | 210/44 |
|---|---|---|---|
| 1,295,817 | 2/1919 | Towne | 210/44 |
| 2,065,053 | 12/1936 | Christmann | 210/44 |
| 2,307,082 | 1/1943 | Grotenheis | 261/DIG. 26 |
| 2,313,007 | 3/1943 | Abribat | 210/44 |
| 2,725,985 | 12/1955 | Howard | 210/44 |
| 3,886,068 | 5/1975 | Eron | 210/44 |
| 3,900,420 | 8/1975 | Sebba | 210/63 R |
| 4,044,696 | 8/1977 | Maricek | 210/71 |
| 4,053,399 | 10/1977 | Donnelly | 210/44 |
| 4,066,540 | 1/1978 | Wada | 210/44 |

FOREIGN PATENT DOCUMENTS

| 51-107274 | 9/1976 | Japan | 210/44 |
|---|---|---|---|
| 289838 | 4/1969 | U.S.S.R. | 210/44 |
| 197708 | 8/1977 | U.S.S.R. | 210/44 |

OTHER PUBLICATIONS

"Detergent Removal by Surface Stripping", Klein, vol. 35, No. 1, Journal WPCF, Jan. 1963, 100–115.
The Condensed Chemical Dictionary, Van Nostrand, Hawley, Eighth Edition, 1971, 639, 937.

Primary Examiner—Ernest G. Therkorn
Attorney, Agent, or Firm—Steinberg & Raskin

[57] ABSTRACT

The method according to the present invention ensures a thermal decontamination of waste waters. The method comprises passing a combustible gas through said waste waters in the presence of surfactants. Said combustible gas is passed in an amount sufficient to convert said waste waters to a combustible foam; the surfactants are added to convert the entire volume of said waste waters to the combustible foam. Then the resulting foam is subjected to combustion.

4 Claims, 1 Drawing Figure

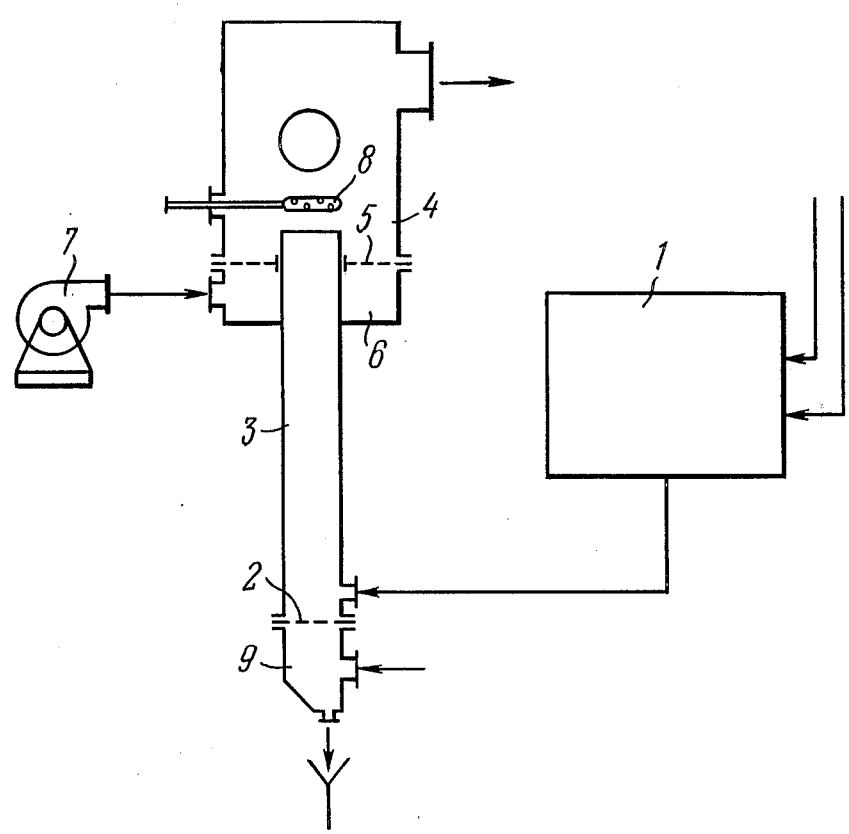

METHOD FOR THERMAL DECONTAMINATION OF WASTE WATERS

This is a continuation of application Ser. No. 901,305, filed May 1, 1978, now abandoned.

FIELD OF THE INVENTION

The present invention relates to methods for decontamination of waste waters and, more specifically, to methods for a thermal decomposition of waste waters. The method of the present invention is useful in industries where the production process is accompanied by the formation of liquid industrial waste waters.

The present invention may be used in chemical, petrochemical, metallurgical, food, medical and other industries wherein there occurs the formation of harmful waste waters and liquid wastes the discharge of which into water basins is prohibited.

It is most preferred to use the method according to the present invention for decontamination of industrial waste waters having the following characteristics:

waste waters containing organic and inorganic substances resulting from the manufacture of synthetic resins, dyes and intermediate products;

waste waters resulting from washing of containers from various chemicals, paints and varnishes;

waste waters containing petroleum products, mineral oils and production wastes from organic syntheses;

waste waters containing halogenated compounds and impurities resulting from the chlorination of organic compounds;

waste water containing slurries and impurities in the form of particles of various synthetic resins and plastics;

waste waters containing impurities of pigments, slurries and suspensions impossible to remove by methods of mechanical cleaning, filtration and centrifugation.

In every case waste waters should be subject to a laboratory test to find out the possibility of decontamination thereof in foam-generating reactors.

BACKGROUND OF THE INVENTION

Known in the art are methods for a thermal decontamination of waste waters contemplating evaporation of waste waters in evaporators of different types, combustion of wastes in chamber-, shaft-, cyclone-type and other combustion means.

These prior art methods have a disadvantage residing in impossibility of utilization of thermal decomposition in the case of heavily contaminated wastes tending to foam and having a high content of slimes, suspensions and mechanical impurities. However, there is known in the art a methhod for a partial thermal purification of waste waters from surfactants by combustion of a float-condensate (cf. Klein S. A., McGayhey P. H.—Journal Water Pollut. Control Federat. 1963, 35, No. 1, 110).

Foam is formed by bubbling air by means of a perforated plate through the layer of waste waters. Foam is blown off by means of an air jet from the layer top and delivered to the combustion compartment, wherein it is destroyed and the resulting drops of a float-condensate are incinerated along with the fuel.

This prior art method also has a disadvantage which resides in that it enables elimination of only surfactants passing into the float-condensate and a minor portion of mechanical impurities, whereas the main portion of the contaminants remains in the waste water, since upon destruction of the surfactants their floatation properties disappear.

It is an object of the present invention to provide a highly-efficient method for a thermal decontamination of waste waters.

This and other objects of the present invention are accomplished by the method for thermal decomposition of waste waters in accordance with the present invention, wherein a combustible gas is passed into the waste waters for the formation of a combustible foam and surfactants are added thereto to convert the entire volume of the waste waters to the combustible foam.

This method ensures formation of foam containing a combustible gas in its bubbles. An extensively developed surface of contact between the high-temperature products of combustion of the combustible gas and foam bubbles defines a high intensity of heat- and mass-transfer processes. The foam is rapidly evaporated, the combustible gas is liberated therefrom and is combusted along with the foam particles.

It is desirable that introduction of the combustible gas into the waste waters be effected by bubbling under a gauge pressure to ensure a moving stream of the combustible foam.

BRIEF DESCRIPTION OF THE DRAWING

The present invention is further explained by the following detailed description of its embodiments with reference to the accompanying drawing, wherein the Figure shows an apparatus for decontamination of waste waters by the method according to the present invention.

DETAILED DESCRIPTION OF THE INVENTION

The method of the present invention is based on combustion of a foam preliminarily formed from the entire volume of the waste waters along with the gas englobed in the foam bubbles. For the formation of such foam it is necessary to pass a combustible gas into waste waters in the presence of surfactants. To provide a moving stream of statically stable cellular foam it is preferable to effect bubbling of a combustible gas under a gauge pressure through the waste waters.

Addition of surfactants into the waste waters in an amount required to convert the entire volume of the waste waters to foam ensures applicability of the method according to the present invention also to such waste waters which contain no surfactants, or in which the content of the latter is very small.

The method for a thermal decontamination of waste waters is performed by means of an apparatus operating in the manner described hereinbelow.

The waste waters to be decontaminated are delivered into a reservoir 1 as shown in the drawing for a preliminary treatment of surfactants in an amount required to completely convert the entire volume of the waste waters to foam. From the reservoir 1 the waste waters are fed into a foam-generating apparatus onto a grate 2. At the same time, a combustible gas is fed under the grate 2 for bubbling through the liquid and formation of statically stable cellular foam.

The resulting stream of foam moves along a column 3 towards a reactor consisting of a combustion chamber 4, an air-distributing grate 5 and an air chamber 6.

Simultaneously, due to flotation properties, all solid and suspended impurities are entrained by the foam stream and combusted along with the conbustible gas.

Air is fed into the combustion chamber 4 through the air-distribution grate 5 by means of a blower 7 to ensure a stable burning of the gas and foam.

For inflammation of the gas, the latter is fed into the chamber through a torch 8 or use is made of an electrical ignition means. To maintain a stable combustion of the gas and foam-like waste waters, the chamber lining should be heated to a required temperature.

An extensively developed surface of contact between the flue gases and foam bubbles obtained from the waste water ensures a high intensity of heat- and mass-transfer. The foam is rapidly evaporated and the gas englobed in its bubbles is liberated thus forming a stable flame torch over the outlet of the cavity 3.

The combustion products may be delivered from the chamber to appropriate units for the removal of the resulting solid particles therefrom and to apparatus for utilization of heat and condensation of water.

As the combustible gas use may be made of natural gas, off-gases from petroleum refining, coke gas obtained from sublimation of a solid fuel.

EXAMPLE 1

Waste waters intended for a thermal decontamination contain 184 g of dry solids per one liter of the waste water including 60 g/l of organic compounds, 74 g/l of mineral salts and 50 g/l of insoluble impurities. Upon the addition of 20 g/l of a surfactant, i.e. synthanol, to the waste waters and bubbling of natural gas therethrough, said waste water is completely converted to foam which is then combusted fully in a combustion chamber.

EXAMPLE 2

Waste waters intended for a thermal decontamination and resulting from machining of non-ferrous metals contain 200 to 250 g of dry solids per one liter of the waste water, including 30–35 g/l of organic compounds, 100–150 g/l of mineral salts and 65 g/l of soluble impurities. Upon addition of 5–10 g/l of a surfactant, i.e. sulphanol, to the waste water and bubbling natural gas therethrough, the waste water is totally converted to foam which is fully combusted in a combustion chamber.

EXAMPLE 3

Waste waters for a thermal decontamination resulting from the manufacture of phenolic resins contain 100 to 150 g of dry solids per one liter of the waste water including 50–70 g/l of organic compounds, 30–50 g of mineral salts and 20–30 g/l of soluble impurities. Upon addition to the waste water of 2–6 g/l of a surfactant, i.e. synthanol, and bubbling natural gas therethrough, the waste water is combusted in a combustion chamber.

Decontamination of the above-mentioned waste waters is effected at a temperature of combustion of the combustible gas (i.e. within the range of from 1,400° to 2,000° C.). The resulting combustion products consist of inert gases ($CO_2$, $N_2$) and water vapours which, after utilization of heat and cleaning of the gases, are vented to the atmosphere in compliance with the requirements of sanitary norms.

For a thermal decontamination of 1 kg of waste water heat is consumed in an amount of 720–750 kCal (including utilization of heat of the combustion products) which ensures a coefficient of utilization of the calorific value of the gaseous fuel as high as 90 to 96%.

What is claimed is:

1. The method for the thermal decontamination of waste waters which contain solid impurities, which comprises passing a gas which in its entirety is combustible through said waste waters in the presence of surfactants in an amount sufficient for conversion of all of said waste waters to a foam formed of foam bubbles in which said solid impurities are suspended and which contain said gas within the bubbles and is combustible due to the combustible gas, and subjecting said combustible foam to combustion, whereby the entire foam and thus all of the waste water is evaporated and the combustible gas contained in the bubbles is liberated and continues to burn as a stable flame to burn off contaminants including said solid impurities in the waste water.

2. The method as claimed in claim 1, wherein said combustible gas is passed through said waste waters by bubbling under a gauge pressure to provide a moving stream of said combustible foam.

3. Method according to claim 2 wherein the gas passed through the waste waters is natural gas.

4. Method according to claim 1 wherein the gas passed through the waste waters is natural gas.

* * * * *